No. 818,455. PATENTED APR. 24, 1906.
F. J. LAROCK.
CULINARY UTENSIL.
APPLICATION FILED JULY 28, 1905.
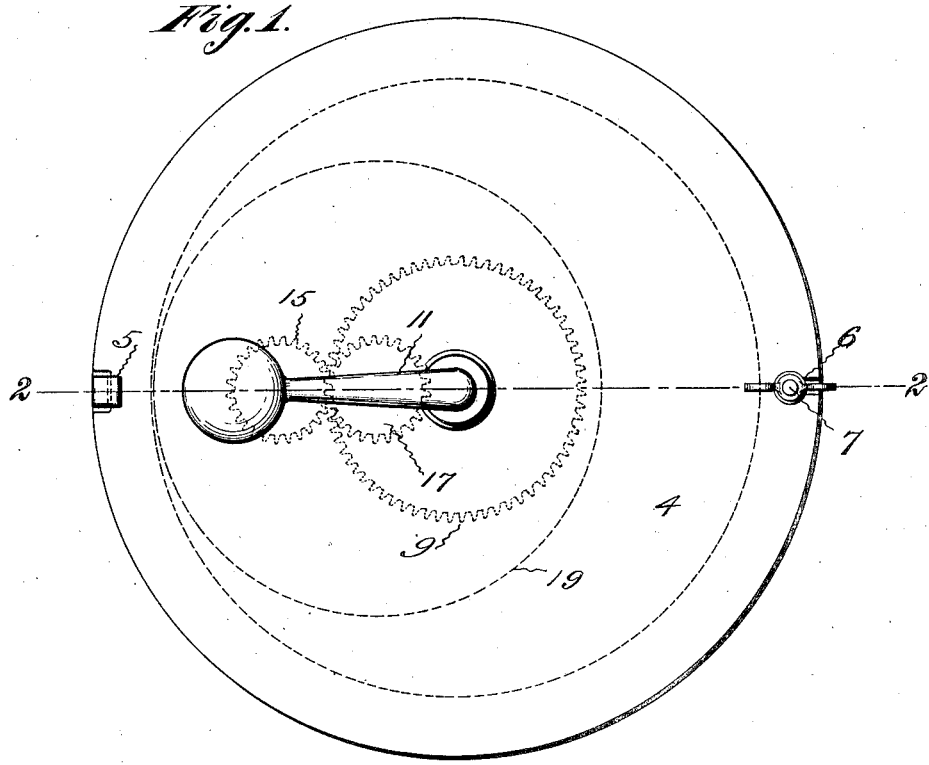
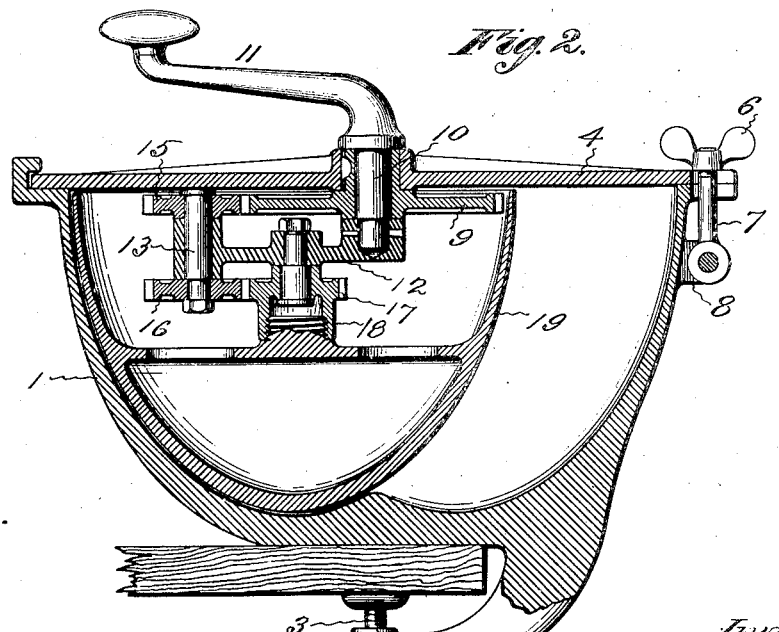
Witnesses:
J. E. Anderson.
Ethel M. Lowe.
Inventor:
Frederick J. Larock,
By his Attorney,
Harry R. Williams

UNITED STATES PATENT OFFICE.

FREDERICK J. LAROCK, OF EAST HARTFORD, CONNECTICUT.

CULINARY UTENSIL.

No. 818,455.　　　　Specification of Letters Patent.　　　　Patented April 24, 1906.

Application filed July 28, 1905. Serial No. 271,619.

*To all whom it may concern:*

Be it known that I, FREDERICK J. LAROCK, a citizen of the United States, residing at East Hartford, in the county of Hartford and State of Connecticut, have invented a new and useful Culinary Utensil, of which the following is a specification.

This invention relates to a utensil which is designed for beating, mashing, mixing, and whipping food substances—such as eggs, sugar, butter, flour, milk, cream, and similar ingredients—which are used for making cake, pastry, desserts, and the like articles of food.

The object of the invention is to provide a simple, convenient, and easily-operated device of this nature which will thoroughly beat, mash, mix, and whip any ingredients which are placed within it.

The embodiment of the invention which is illustrated has a covered receptacle or bowl designed to be attached to a table or similar support and provided with a mixer or pestle which is arranged to be revolved about the inner wall of the bowl and at the same time rotated on its axis, so as to thoroughly stir, mash, and mix the ingredients into a smooth soft mass.

Figure 1 of the accompanying drawings shows a plan of the utensil. Fig. 2 shows a central vertical section of the same on the plane indicated by the line 2 2 on Fig. 1.

The bowl 1, which may be formed any desired size of any suitable material, preferably galvanized iron, is provided with an arm 2, which supports a clamp-screw 3, that may be used for fastening the bowl to the edge of a table or similar support. A cover 4 is designed to close the top of the bowl. This cover is preferably temporarily held in place at the back by a lug 5, that extends from the edge of the bowl, and at the front by a nut 6, that turns on a swivel-bolt 7, held by a lug 8, which projects from the side of the bowl. Supported by and immovably connected with the cover is a gear 9. Extending through an opening in the hub of this gear is the stem 10 of the crank-handle 11. Fastened to the lower end of the stem of this handle is an arm 12. The outer end of this arm supports an arbor 13. Keyed to the upper end of this arbor is a pinion 15, that meshes with the fixed gear, and keyed to the lower end is a pinion 16, that meshes with a gear 17 on a hub 18, which is supported by the arm between the handle-stem and the arbor.

The pestle 19, which is preferably an inverted-dome-shaped piece having either a smooth or roughened surface, is fastened to the gear-hub 18. The outline of this pestle is such and it is so hung that its outer wall conforms with and extends close to the inner wall of the bowl.

When the handle is turned, the arm bearing the pinions and the pestle is revolved so that the pestle revolves around the interior of the bowl close to the wall. As the central gear, supported by the cover, is fixed, the revolution of these part through the pinions causes the pestle to rotate on its axis at the same time that it revolves. The gears and pinions are so arranged that as the pestle revolves it rotates in a direction reversely to the direction in which it revolves, and consequently the ingredients placed in the bowl are by the friction of the walls of the rotating pestle drawn inwardly between the pestle and the walls of the bowl and crushed and mashed together as the pestle revolves.

As a result of this construction eggs can be very quickly beaten, cream can be thoroughly whipped, sugar, butter, and the like ingredients for cake, pastry, and other purposes can be quickly and thoroughly mashed and mixed, all lumps in the ingredients are reduced, and slippery and greasy matters are thoroughly mashed together and incorporated with each other, so as to form a smooth soft mass, particularly desirable for producing good culinary effects.

The cover prevents the ingredients from spilling, and the pestle extends to the under side of the cover, so that the substance will not easily get into it. The device is easily applied to a support, and by unscrewing the butterfly-nut the mechanism may be quickly removed for cleaning.

The invention claimed is—

1. A culinary utensil having a bowl, a cover for the bowl, a gear supported by the cover, a handle having a stem extending through the cover, an arm secured to the handle-stem, a pestle supported by the arm, a gear attached to the pestle, and pinions carried by the arm, one meshing with the cover-gear and the other meshing with the pestle-gear, substantially as specified.

2. A culinary utensil having a bowl, a cover for the bowl, an external gear supported by the cover, a handle having a stem extending through the cover and the gear, an arm secured to the handle-stem inside of the gear, a pestle rotarily supported by the arm, a gear attached to the pestle, an arbor supported by the arm, a pinion attached to one end of the arbor and meshing with the cover-gear, and a pinion attached to the other end of the arbor and meshing with the pestle-gear, substantially as specified.

3. A culinary utensil having a bowl, a cover for the bowl, an external gear supported by the cover, a handle having a stem extending through the cover and the gear, an arm secured to the handle-stem inside of the gear, a gear rotarily supported by the arm, an arbor carried by the arm, a pinion attached to one end of the arbor and meshing with the gear that is fastened to the cover, a pinion attached to the other end of the arbor and meshing with the gear that is carried by the arm, and a hollow pestle fastened to the gear carried by the arm and inclosing the gears and pinions, substantially as specified.

FREDERICK J. LAROCK.

Witnesses:
HARRY R. WILLIAMS,
ETHEL M. LOWE.